July 9, 1957  W. D. TILTON, JR., ET AL  2,798,787
RECORDING DEVICE
Filed June 14, 1954  2 Sheets-Sheet 1

Inventors
Claude M. Hathaway
Warren D. Tilton, Jr.
By Alois W. Graf
Attorney

July 9, 1957 W. D. TILTON, JR., ET AL 2,798,787
RECORDING DEVICE
Filed June 14, 1954 2 Sheets-Sheet 2
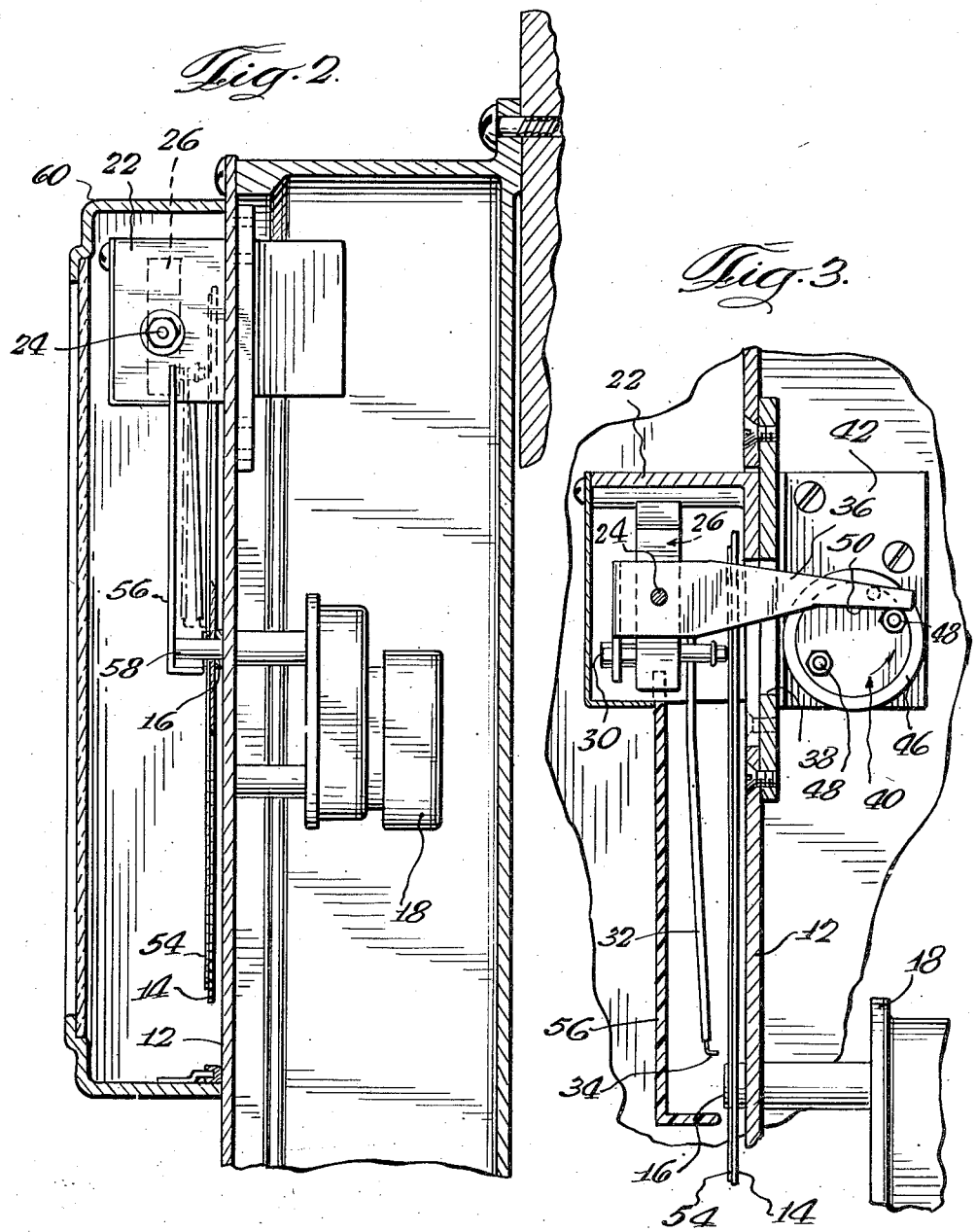

… … … … … … … … … … … … … … … … … … … … … … … … … … … … … … … … … … … … … … … … … …

2,798,787

RECORDING DEVICE

Warren D. Tilton, Jr., and Claude M. Hathaway, Denver, Colo., assignors, by mesne assignments, to Hamilton Watch Company, Lancaster, Pa., a corporation of Pennsylvania Application June 14, 1954, Serial No. 436,675

8 Claims. (Cl. 346—139)

The present invention relates to devices for recording physical phenomenon, particularly electrical signals.

There are many occasions in which it is desirable to continuously record an electrical or mechanical signal in order to obtain a historical representation of a physical phenomenon without the necessity of performing a large number of measurements. Examples of suitable electrical and mechanical signals for recordation are obvious, and include pressures, rates of flow, temperatures, electrical potentials and currents. The present invention is applicable to recording all such electrical and mechanical signals, but it has particular advantages when used for the recording of electrical signals.

One of the recording devices in common use utilizes a pivotally mounted marking device in the form of a pen which has an angular position responsive to the signal to be recorded and is in contact with a translatable paper recording element. One of the difficulties encountered with devices of this type is that ink occasionally clogs the pen causing the pen to fail to record properly. Another difficulty with such devices is that the pen places a drag on the paper and tends to hinder the motion of the paper at the uniform rate required to correctly record the physical phenomenon relative to time, or some other base.

One way of eliminating the problems arising from the clogging of pens in recording equipment is to use an electrically conducting recording paper which changes color when an electrical current passes through the paper, commonly termed "teledeltos" paper, rather than conventional paper, support it on an electrically conducting surface, and use an electrically conducting stylus in contact with the paper as a marking device. An electrical current can then be made to flow through the electrically conducting paper in the limited area between the stylus and the support, thus indicating the position of the stylus by a color change in this area. Unfortunately the presently available electrically conducting recording paper aggravates the drag problem caused by the pen riding in contact with the paper, since the electrically conducting paper generally has a rougher surface than conventional paper and the friction between the stylus and the electrically conducting paper is greater than that between a pen and ordinary paper. The drag occasioned by a conventional pen is reduced by the lubrication afforded by the ink, and this lubrication is not available to a recording device using electrically conducting recording paper. Also, the current flowing across the interface between the stylus and the electrically conducting recording paper increases the friction between the stylus and the electrically conducting paper. Even in conventional pen type recording devices, the paper is usually gripped by gear teeth, or the like, in order to prevent slipping of the paper on the surface of its transporting means, and this is especially important for known devices using electrically conducting recording paper.

It is an object of the present invention to provide a recording device which requires no teeth, or other keying means, to secure the recording paper to the surface of a transporting means in order to move the recording paper past the marking device free from slippage.

It is a further object of the present invention to provide a recording device using electrically conducting recording paper which is transported relative to a marking device in which the drag caused by the contact of the marking device on the electrically conducting paper has been essentially eliminated.

Other objects and advantages of the present invention will become readily apparent to the man skilled in the art from a further reading of the present disclosure, particularly when viewed in the light of the drawings, in which:

Figure 2 is a sectional view of the recording device taken along line 2—2 of Figure 1; and Figure 3 is a sectional view of the recording device taken along line 3—3 of Figure 1.

Figure 1:
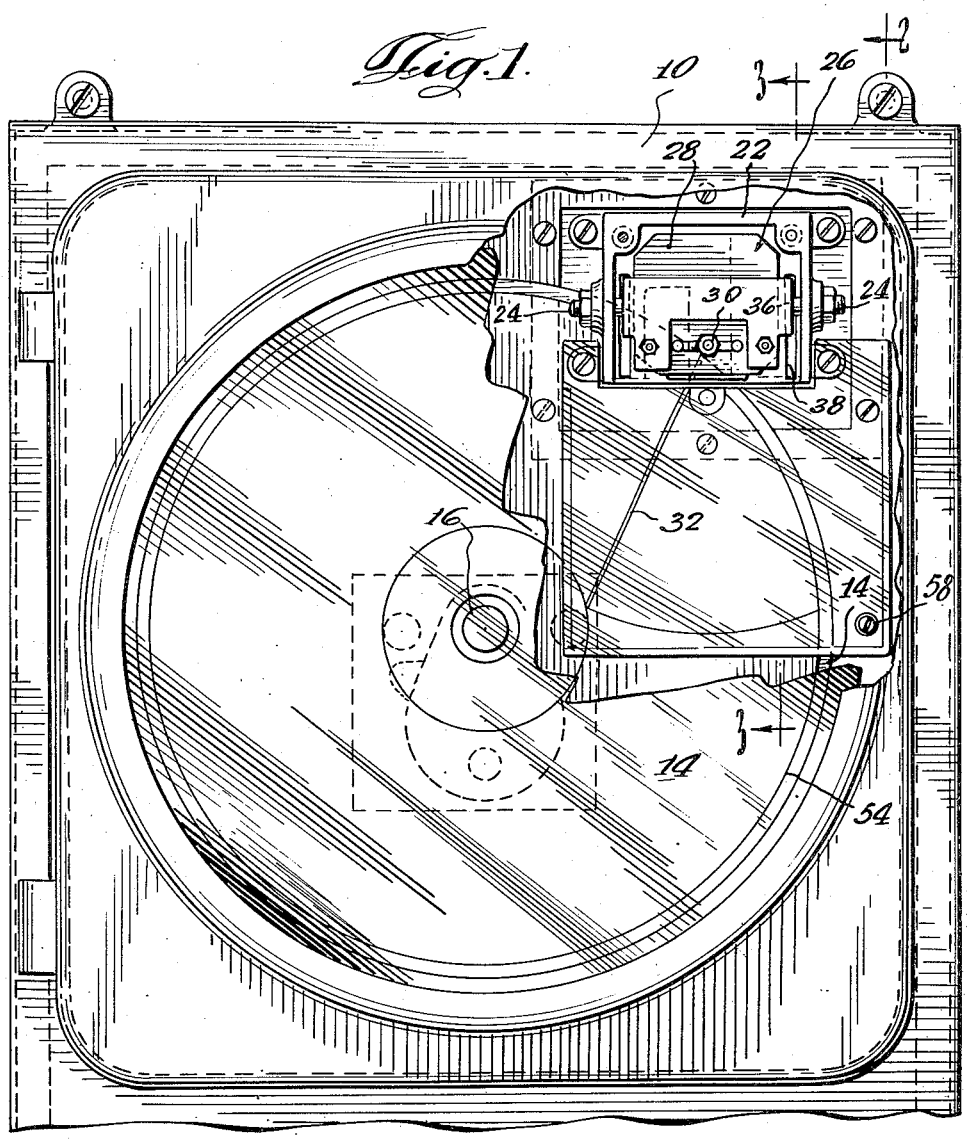
Figure 1 is a plan view of a recording device constructed according to the teachings of the present invention.

As illustrated in the figures, the recording device has a housing 10 with a support plate 12 which is adapted to be horizontally disposed. A turn table 14 constructed of electrically conducting material is rotatably mounted adjacent to the support plate 12 by a shaft 16 normally attached to the center of the turn table 14 and extending through the support plate 12. The shaft 16 is coupled to a constant speed motor 18 mounted to the support plate 12 on the side opposite to the turn table 14.

A housing 22 for pivotally supporting a signal responsive device, such as a galvanometer assembly 26, is rigidly attached to the support plate 12 adjacent to the periphery of the turn table 14. A shaft 24 traverses the housing 22 parallel to the face of the turn table 14 and pivotally supports the galvanometer assembly 26. The galvanometer assembly 26 contains a D'Arsonval galvanometer movement with a magnet 28 and a rotatable coil 30 in the conventional manner. The rotatable coil 30 of the galvanometer assembly 26 is disposed adjacent to the periphery of the turn table 14, and an arm 32 constructed of electrically conducting material is attached to and rotatable with the coil 30. The arm 32 terminates in a stylus 34, also constructed of electrically conducting material, which is adapted to contact the surface of the turn table 14, and hence constitutes the marking device of the recording device.

A lever arm 36 attached to one end of the galvanometer assembly 26 and journaled about the shaft 24 of the housing 22 extends downwardly through an aperture 38 in the support plate 12. The lever arm 36 engages a cam 40 rotatably mounted to the support plate 12 adjacent to the aperture 38 on the side opposite to the housing 22. The cam 40 is attached to a constant speed motor 42 and rotates in a counterclockwise direction with the motor 42. The cam itself comprises a disc 46 with a pair of protruding bolts 48 disposed adjacent to the periphery of the disc 46 on opposite sides of the axis thereof. The lever arm 36 is provided with a straight portion 50 confronting the cam 40 and in slidable contact with the cam 40. The stylus 34 contacts the face of the turn table 14 only when the cam 40 is disposed with the bolts 48 aligned within an angle having a bisector approximately parallel to the support plate 12.

A disc 54 of electrically conducting recording paper, generally called "teledeltos" paper, is disposed on the turn table 14 with its center disposed about the shaft 16, and it frictionally engages the face of the turn table 14. Sufficient friction exists between the electrically conducting recording paper 54 and the face of the turn table 14 to prevent slipping of the paper 54 during the period of contact of the stylus 34 therewith.

A shield 56 is attached to the housing 22 and extends outwardly from the housing 22 covering the area of the turn table 14 traversed by the arm 32. The shield 56 is supported on a post 58 disposed adjacent to the periphery of the turn table 14 at the extremity of the shield 56. A cover 60 is removably mounted on the support plate 12 and extends over the turn table 14 and the housing 22 to prevent dust and other objectionable particles from falling on the device. A source of direct current, not illustrated, is connected to the arm 32 and the turn table 14.

When an electrical signal is applied to the galvanometer assembly 26, the arm 32 will rotate with the coil 30 and assume a position along its arc. The cam 40 is continuously rotated at a constant speed by the motor 42, and through the lever arm 36, the cam 40 periodically pivots the galvanometer assembly 26 on the shaft 24 causing the stylus 34 to contact the electrically conducting recording paper on the face of the turn table 14. The electrical potential applied to the turn table 14 and to the arm 32 of the galvanometer unit 26 causes an electrical current to traverse the electrically conducting recording paper 54 through the limited area of contact of the stylus 34 causing the paper to change color in this area. The periodic contacts of the stylus 34 with the paper 54 results in a continuous series of marks which indicates the magnitude of the electrical signal applied to the galvanometer assembly 26.

It will be seen that the periodic contact of the arm 32 with the recording paper 54 provides only momentary drag upon the rotation of the electrically conducting recording paper 54, thus eliminating the necessity for keying the recording paper to the turn table 14 and eliminating any error in rotation rate of the turn table 14 caused by the drag of the marking device. The man skilled in the art will readily perceive many other advantages of the recording device here disclosed, and it is intended that the scope of the present invention be not limited except in so far as set forth in the appended claims.

What is claimed is:

1. A recording device comprising a support member, means responsive to the signal to be recorded mounted to the support member including an element adapted to be deflected by the signal, said signal responsive means being pivotally disposed relative to the support member in a plane normal thereto, means for transporting a recording element medium along a path extending adjacent to the deflectable element, and means for marking said recording medium being transported by said transporting means attached to the deflectable element of the signal responsive means, said marking means terminating over the path of said recording medium, yieldable mechanical biasing means coupled to the signal responsive means for maintaining the marking means out of the path of said recording medium, and means coupled to the signal responsive means for periodically pivoting said signal responsive means and said deflectable element to position the marking means in the path of said recording medium.

2. A recording device comprising the elements of claim 1 in combination with a recording element disposed upon the means for transporting said recording medium.

3. A recording device comprising a support member, means responsive to the signal to be recorded including an element adapted to be angularly deflected by the signal, means to pivotally mount the signal responsive means to the support member, means for transporting a recording medium along a path extending adjacent to the signal responsive means, means for marking said recording medium attached to the deflectable element and positioned over the path of said recording medium, a cam rotatably mounted to the support member, means to rotate the cam, yieldable mechanical biasing means coupled to the signal responsive means for maintaining the marking means out of the path of said recording medium, and a lever arm attached to the signal responsive means and contacting the cam, said lever arm pivoting the signal responsive means against its biasing means to position the marking means in the path of said recording medium in response to the rotation of the cam.

4. A recording device for electrical signals comprising a support member, a galvanometer assembly having a current responsive element adapted to be deflected by the electrical signal to be recorded, means for pivotally mounting the galvanometer assembly to the support member, means for transporting a recording medium along a path adjacent to the galvanometer assembly, and means for marking said recording medium including a marking device attached to the current responsive element of the galvanometer assembly, said marking device being disposed over the path of said recording medium, yieldable mechanical biasing means attached to the galvanometer assembly for maintaining the marking device out of contact with said recording medium, and means coupled to the galvanometer assembly for periodically pivoting the galvanometer assembly to bring the marking device into the path of said recording medium.

5. A recording device for electrical signals comprising a support member, a galvanometer assembly having a current responsive element adapted to be angularly deflected by the electrical signal to be recorded, means for pivotally mounting the galvanometer assembly to the support member, a turn table rotatably mounted to the support member adjacent to the galvanometer assembly adapted to rotate a recording disc on the face thereof, and means for marking the recording disc including an arm attached to the current responsive element of the galvanometer assembly adapted to be deflected in an arc between the periphery of the disc and the axis thereof, yieldable mechanical biasing means attached to the galvanometer assembly for maintaining the arm out of contact with the recording disc, and means coupled to the galvanometer assembly for periodically pivoting the galvanometer assembly to bring the arm into contact with the recording disc.

6. A recording device for electrical signals comprising a support member, a turn table adapted to rotate a recording disc on the face thereof rotatably mounted to the support member, means to rotate the turn table coupled thereto, a galvanometer assembly having a current responsive element adapted to be angularly deflected by the electrical signal to be recorded, means attached to the support member for mounting the galvanometer assembly adjacent to the turn table to pivot about an axis parallel to the face of the turn table and traversing the galvanometer assembly between its center of gravity and the turn table, a cam, means to rotate the cam at a constant rate, and a lever arm pivotally attached to the support member having one end coupled to the galvanometer assembly and the other end in contact with the cam.

7. A recording device for electrical signals comprising a support member, a galvanometer assembly having a current responsive element adapted to be deflected by the electrical signal to be recorded, means for pivotally mounting the galvanometer assembly to the support member, electrically conducting means for transporting an electrically conducting recording medium which produces an indication of the area of conduction therethrough along a path extending adjacent to the galvanometer assembly, and means for marking said recording medium including an arm constructed of electrically conducting material attached to the current responsive element of the galvanometer assembly and terminating in an electrically conducting stylus, said arm terminating over the path of said recording medium, yieldable mechanical biasing means attached to the galvanometer assembly for maintaining the stylus out of the path of said recording medium, and means coupled to the galvanometer assembly for periodically pivoting the galvanometer assembly to bring the stylus into the path of said recording medium.

8. A recording device for electrical signals comprising a support member, an electrically conducting turn table rotatably mounted to the support member adapted to rotate a disc of electrically conducting recording paper thereon, means to rotate the turn table at a constant rate coupled thereto, a galvanometer assembly having a current responsive element adapted to be angularly deflected by the electrical signal to be recorded, means attached to the support member for mounting the galvanometer assembly adjacent to the turn table to pivot about an axis parallel to the face of the turn table and traversing the galvanometer assembly between its center of gravity and the turn table, a cam, means to rotate the cam at a constant rate about an axis parallel to the pivotal axis of the galvanometer assembly, a lever arm attached to the galvanometer assembly at one end and in slidable contact with the cam, and an electrically conducting arm provided with an electrically conducting stylus at one end and attached to the current responsive element of the galvanometer assembly at the other end, said arm being positioned above the turn table by a gravity bias except for periods in which the cam forces the stylus toward the turn table.

References Cited in the file of this patent

FOREIGN PATENTS

| | | |
|---|---|---|
| 353,352 | Germany | May 5, 1921 |
| 584,122 | Germany | Aug. 8, 1931 |